US009564023B2

(12) United States Patent
Richards et al.

(10) Patent No.: US 9,564,023 B2
(45) **Date of Patent: *Feb. 7, 2017**

(54) GAMING SYSTEM AND GAMING MACHINES UTILIZING TICKETS HAVING A FEATURE TRIGGER

(71) Applicant: Everi Payments Inc., Las Vegas, NV (US)

(72) Inventors: Timothy Richards, Henderson, NV (US); Raymond Dumbeck, Austin, TX (US); Scott Howard Betts, Parker, CO (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,876

(22) Filed: Aug. 10, 2015

(65) Prior Publication Data

US 2016/0098903 A1 Apr. 7, 2016

Related U.S. Application Data

(63) Continuation-in-part of application No. 14/472,791, filed on Aug. 29, 2014, now Pat. No. 9,105,153, which (Continued)

(51) Int. Cl.

*G06F 17/00* (2006.01)
*G07F 17/42* (2006.01)

(Continued)

(52) U.S. Cl.

CPC ........... *G07F 17/42* (2013.01); *G07F 17/3223* (2013.01); *G07F 17/3246* (2013.01);

(Continued)

(58) Field of Classification Search

USPC ............................................ 463/16–27, 42

See application file for complete search history.

(56) References Cited

U.S. PATENT DOCUMENTS

| | | | |
|---|---|---|---|
| 5,290,033 | A | 3/1994 | Bittner et al. |
| 6,048,269 | A | 4/2000 | Burns et al. |

(Continued)

FOREIGN PATENT DOCUMENTS

| | | |
|---|---|---|
| EP | 0919965 | 6/1999 |
| JP | 09215812 | 8/1997 |

(Continued)

OTHER PUBLICATIONS

Notification of Transmittal of the International Search Report and the Written Opinion of the International Searching Authority, or the Declaration Mailed Mar. 11, 2013, for PCT/US2012/056815.

(Continued)

*Primary Examiner* — Ronald Laneau

(74) *Attorney, Agent, or Firm* — Weide & Miller, Ltd.

(57) ABSTRACT

A casino gaming system includes gaming machines which are configured to accept and read tickets. The ticket may comprise cash-value tickets or non-cash value/promotional tickets. The tickets may also include secondary feature triggering indicia. The player may present the cash-value ticket having a feature triggering indicia or a non-cash value/promotional ticket to a gaming machine, such as by inserting it into a media reader such as a bill acceptor. Associated monetary value or non-monetary credits may be credited to the machine. In addition, if the ticket includes a feature triggering indicia, when such an indicia is detected, the gaming machine preferably triggers or initiates the feature.

24 Claims, 9 Drawing Sheets

Related U.S. Application Data is a continuation of application No. 13/627,298, filed on Sep. 26, 2012, now Pat. No. 8,821,259.

(60) Provisional application No. 61/540,852, filed on Sep. 29, 2011.

(51) Int. Cl.
*G07F 19/00* (2006.01)
*G07F 17/32* (2006.01)

(52) U.S. Cl.
CPC ...... *G07F 17/3248* (2013.01); *G07F 17/3267* (2013.01); *G07F 19/20* (2013.01)

(56) References Cited

U.S. PATENT DOCUMENTS

| | | | | |
|---|---|---|---|---|
| 6,394,907 | B1 | 5/2002 | Rowe | |
| 6,682,421 | B1 | 1/2004 | Rowe et al. | |
| 6,729,957 | B2 | 5/2004 | Burns et al. | |
| 6,729,958 | B2 | 5/2004 | Burns et al. | |
| 6,736,725 | B2 | 5/2004 | Burns et al. | |
| 6,852,031 | B1 | 2/2005 | Rowe | |
| 7,100,916 | B2 | 9/2006 | Kelly et al. | |
| 7,275,991 | B2 | 10/2007 | Burns et al. | |
| 7,455,591 | B2 | 11/2008 | Nguyen | |
| 7,674,177 | B2 | 3/2010 | Cole | |
| 7,785,193 | B2 | 8/2010 | Paulsen et al. | |
| 7,896,739 | B2 | 3/2011 | Cole | |
| 8,251,791 | B2 | 8/2012 | Baerlocher et al. | |
| 8,328,636 | B2 | 12/2012 | Jaffe et al. | |
| 8,671,019 | B1 | 3/2014 | Barclay et al. | |
| 8,821,259 | B2 | 9/2014 | Betts et al. | |
| 8,821,292 | B2 | 9/2014 | Betts et al. | |
| 9,105,153 | B2 | 8/2015 | Betts et al. | |
| 9,153,097 | B2 | 10/2015 | Betts et al. | |
| 2003/0013515 | A1 | 1/2003 | Rowe et al. | |
| 2003/0013531 | A1 | 1/2003 | Rowe et al. | |
| 2003/0087691 | A1 | 5/2003 | Kiely et al. | |
| 2004/0259622 | A1 | 12/2004 | Duhamel | |
| 2005/0014556 | A1 | 1/2005 | Duhamel | |
| 2005/0059494 | A1* | 3/2005 | Kammler ................ | G07F 17/32 463/42 |
| 2005/0064925 | A1 | 3/2005 | Robb | |
| 2005/0282626 | A1 | 12/2005 | Manfredi et al. | |
| 2006/0073883 | A1 | 4/2006 | Franks, Jr. | |
| 2006/0178208 | A1 | 8/2006 | Cole | |
| 2007/0129136 | A1 | 6/2007 | Walker et al. | |
| 2007/0213124 | A1 | 9/2007 | Walker et al. | |
| 2009/0005154 | A1 | 1/2009 | Schultz | |
| 2009/0111572 | A1 | 4/2009 | Bigelow, Jr. et al. | |
| 2009/0242635 | A1 | 10/2009 | Meier et al. | |
| 2010/0041472 | A1 | 2/2010 | Gagner et al. | |
| 2010/0137059 | A1 | 6/2010 | Cole | |
| 2011/0014975 | A1 | 1/2011 | Grabiec et al. | |
| 2011/0130195 | A1 | 6/2011 | Cole | |
| 2011/0183745 | A1 | 7/2011 | Gagner et al. | |
| 2011/0183747 | A1 | 7/2011 | Cole | |
| 2011/0300926 | A1 | 12/2011 | Englman et al. | |
| 2012/0215608 | A1 | 8/2012 | Paulos et al. | |
| 2014/0073417 | A1 | 3/2014 | Castle et al. | |
| 2014/0087842 | A1* | 3/2014 | Betts .................. | G07F 17/3248 463/25 |
| 2014/0087880 | A1* | 3/2014 | Betts .................. | G07F 17/3267 463/42 |
| 2014/0206424 | A1 | 7/2014 | Taylor | |
| 2014/0302915 | A1 | 10/2014 | Lyons et al. | |
| 2014/0323206 | A1 | 10/2014 | Gagner et al. | |

FOREIGN PATENT DOCUMENTS

| | | |
|---|---|---|
| JP | 2005052226 | 3/2005 |
| KR | 1020080070625 | 7/2008 |

OTHER PUBLICATIONS

Notification of Transmittal of the International Search Report and the Written Opinion of the International Searching Authority, or the Declaration Mailed Mar. 11, 2013, for PCT/US2012/056807.

* cited by examiner

GAMING SYSTEM AND GAMING MACHINES UTILIZING TICKETS HAVING A FEATURE TRIGGER

PATENT APPLICATION DATA

This application is a continuation-in-part of U.S. patent application Ser. No. 14/472,791, filed Aug. 29, 2014, which is a continuation of U.S. patent application Ser. No. 13/627,298, filed Sep. 26, 2012, now U.S. Pat. No. 8,821,259, and claims priority to U.S. Provisional Patent Application Ser. No. 61/540,852, filed on Sep. 29, 2011.

FIELD OF THE INVENTION

The present invention relates to casino gaming systems and gaming machines and, particularly, to such systems and machines which accept cash tickets.

BACKGROUND OF THE INVENTION

In the past, wagering gaming devices such as slot machines were all configured to accept coins as the basis for a player's wager and were configured to dispense coins as winning payouts or as a cash-out to the player. However, this required players and casinos to handle large amounts of coins and required the slot machines to have complex, expensive and space-occupying coin handling apparatus such as coin acceptors, coin storage and coin dispending apparatus. To address these problems, coin-less and/or entirely cashless gaming systems and gaming machines were developed. In coin-less gaming systems, gaming machines may be configured to accept paper currency as well as accept and dispense paper or similar tickets. In cashless systems, the gaming machines may only be configured to accept and dispense cash tickets.

The tickets used in these "ticket" based gaming systems and gaming machines have associated monetary or cash value and may thus be referred to as cash tickets. Each ticket may have a bar code or other information which identifies the ticket and/or its value, such as for use in validating the ticket when it is later presented by the patron. Such a ticketing system and associated tickets are described in U.S. Pat. No. 6,048,269 to Burns which is incorporated into this application by reference in its entirety.

Relative to these newer "ticket" based systems, a patron can access on-property kiosk and ATM devices to access money from their bank in the form of ATM, check, credit and debit transactions. The patron may obtain this money out of a cash machine such as a Global Cash Access (GCA) ATM product or any number of other GCA devices for use in casinos such as GCA's CasinoCashPlus product or a GCA kiosk. Once the patron's monetary transaction has been approved by the bank or other financial institution, the patron may receive their withdrawal in the form of cash or ticket. When the patron chooses to select the ticket option, a cash ticket is generated. Alternatively, the player may withdraw funds with the aid of a casino cage cashier or provide monetary funds to that cashier and exchange the withdrawn or provided funds for a cash ticket.

The patron may present their cash ticket at a gaming machine or other device that accepts such cash tickets within the casino that issued the ticket or at related casinos in the case of a multi-casino operation. The cash ticket is validated by the particular casino then redeemed and the patron receives his or her cash in the form of credits automatically configured onto the gaming machine or gaming device.

Such traditional ticket validation in a particular casino requires the use of a computer network within the casino along with system components that are approved by the gaming regulatory agencies within which each casino or casino enterprise operates. New features rolled out to this form of a gaming system within the casino requires extensive coordination between vendors along with time consuming jurisdictional approvals and training of casino staff and patrons. Because there is a need to rapidly develop and deploy new patron-desirable features within a casino, it is preferable to have a system where core modifications to existing casino systems are not required.

SUMMARY OF THE INVENTION

One aspect of the invention is a casino ticket system for providing game and credit related features to a gaming machine by using a ticket with special indicia printed on the ticket to trigger special features when the ticket is read at the gaming machine, such as when inserted in a casino gaming machine's bill acceptor. The disclosed system minimizes the complexity of installing new game features into gaming machines within a casino.

In another aspect, the invention comprises the issuance of cash ticket by a system-adapted kiosk to serve a plurality of functions within the casino, wherein the function relating to the cash needs of the patron within the casino are provided for by the issuance of a cash ticket and additionally, the function of providing new game related features activated on the gaming machine when triggered by the cash ticket or an associated ticket issued by the disclosed system.

In another aspect, the invention comprises a system which provides cash tickets with special indicia printed on the ticket that are read using the OCR or other reading or scanning technology, such as found within a gaming machine's bill acceptor or other media reader. Further, when the bill acceptor of a gaming machine reads the ticket generated by the disclosed system, the traditional cash validation process is performed first to validate the ticket is legitimate, resulting in the cash amount accepted by the gaming device and converted to a credit amount that can be used to play the gaming machine.

Next, the gaming machine's bill acceptor scans specific regions of the ticket for indicia printed on the ticket generated by the disclosed system. When specifically defined indicia is located in specifically defined locations, one or more feature triggers are communicated from the bill acceptor to the gaming machine which then enables features on the gaming machine associated with the one or more triggers, such as providing the patron with additional credits or other benefits related to one or more games on the gaming machine.

In one embodiment of the invention, feature triggers comprise indicia that are either printed on a casino ticket prior to being installed in a system kiosk or printed in real-time (i.e. at the time the ticket is generated at the system kiosk). For example, in one embodiment a feature triggering indicia may comprise the particular company logo that has been preprinted on each ticket installed in a system kiosk. The company logo is placed in a very specific location on the cash ticket.

When a patron receives a casino cash ticket from the system kiosk with the preprinted company logo in a specific location, the bill acceptor within the gaming machine scans for the logo. If the bill acceptor finds the logo within the predefined location and it meets the criteria associated with what had been preprinted (in other words avoids counterfeits) a feature triggering indicia or indicator is communicated to the specific gaming machine. The triggered feature may vary. Some examples include, but are not limited to: placing specific credits on the game, opening or initiating a special game feature, initiating or enabling one or more bonus games, providing the player with a special pay table (such as for a predefined number of plays on the game), provide free play or subsidized play, providing a player with objects or features which either increase the probability of the player achieving a game win or a higher game payout, enabling the player to reach a higher level of a game or a game bonus event, or other features.

In one embodiment, the feature triggering indicia or associated indicators are communicated from the gaming machine's bill acceptor to a controller of the gaming machine, causing the activation of features at specific times, random times, time intervals, or other times. When the current time is outside of the times mentioned above, the feature would not be activated by the gaming machine.

In still another aspect of the invention, the feature triggering indicia may provide the patron with additional credits for game play. The credits may also be time activated whereupon additional credits are applied to the gaming machine for example after the player has played the game for greater than a defined time interval, at a specific time of day, on a specific day, has traversed multiple games on the gaming machine, or any other game play scenario that can be tracked and detected by the gaming device.

In embodiments of the invention two or more feature triggering indicia may be printed on the casino ticket. In other embodiments, not all tickets may include a feature triggering indicia at all. Some examples of ticket indicia used as feature triggers include: company logos, specific gaming machine manufactures logo or specific gaming machine manufacturer game logos.

When a plurality of feature trigger indicia is printed on the casino ticket, the gaming machine's bill acceptor may scan for indicia, such as at predefined locations on the ticket. If the indicia are detected, the bill acceptor communicates the feature trigger information to the specific gaming machine. For example: the bill acceptor within the gaming machine may scan for a company logo and for a game logo. In one embodiment, a gaming machine may scan for a particular feature triggering indicia or combination of indicia before a feature is activated. For example, a gaming machine which is configured to present a particular game may scan a ticket for that game logo. If that game logo is found and/or that logo is found along with another feature triggering indicia, the feature may be activated. On the other hand, if the gaming machine does not find the logo or the logo of another game is found, the gaming machine may not present the feature.

In one embodiment of the invention the feature triggering indicia may include a code requiring validation at the gaming machine before any features are enabled at the gaming machine. For example, a specific feature triggering indicia may include a code printed as part of said indicia. The code may be in the form of a barcode such as a QR code. The code is printed along with the indicia at the time of ticket issuance either from a kiosk or another gaming machine. When the ticket is read by a gaming machine, the indicia is first identified as valid then the barcode is decoded and the information pass on to the gaming machine or a remote server or other device for validation. The barcode may include a plurality of encoded information such as serial number and data/time. The gaming machine validates the feature triggering indicia's barcode such as by ensuring the encoded time within the feature triggering indicia is a value within an allowable time interval. Once the feature triggering indicia printed on the ticket has been validated, the feature is enabled on the gaming machine.

In still other aspects of the invention, gaming machine printers are configured to have the capability to print tickets of the invention or configured to dispense tickets of the invention having pre-printed feature triggering indicia on them. For example: a WMS Monopoly® gaming machine may be loaded with blank value tickets which are pre-printed with Monopoly® logo on them. After such a ticket is issued, if it is later presented to another Monopoly® gaming machine, the bill acceptor scans for this logo and communicates with the gaming device that the logo is present which in turn triggers the feature on the gaming machine. This essentially enables gaming machines that have been branded by a specific manufacture to provide special features for patrons to entice them to reinsert a cash ticket into another gaming machine of the same type or belonging to the same manufacturer.

In other aspects of the invention, feature trigger technology may be combined. This includes triggering special features at a gaming machine if the presented ticket was printed from a specific manufacturer's system kiosk and in addition if a specific manufacturer's logo or game brand logo indicia were also printed on the ticket and that particular brand of game accepted the ticket. In such event, the gaming machine might provides both the system kiosk feature trigger in addition to the game brand feature (i.e. the system kiosk feature trigger may initiate 1 free credit on any game whereas if the same ticket has a Monopoly® logo it may also trigger a special game feature or bonus when the ticket is inserted into a Monopoly® gaming machine).

In other aspects of the disclosure, regulatory indicia or responsible gaming indicia may also be printed on the ticket and may be combined with a specific company's indicia and/or game manufacturer/brand indicia. For example, if the regulatory agency had special requirements associated with dynamic features present within the gaming machine, the regulatory logo indicia may be used as a feature trigger that confirms regulatory approval or which specific features may be triggered within that gaming jurisdiction.

In one embodiment of the invention, one or more feature triggering indicia may be associated with a ticket, such as which is generated in association with a transaction performed at a kiosk, issued at cash-out from a gaming machine or the like. The ticket may comprise a cash ticket or might comprise a separate ticket, such as a non-cash value or promotional ticket. The financial transaction might comprise, for example, a player inserting currency or coins into the kiosk in order to obtain a cash ticket which can be used to associate funds with a gaming machine for play of one or more wagering games. The financial transaction might alternatively comprise a debit, credit or other transaction, such as an ATM type transaction in which a player seeks funds from a financial account.

In one embodiment, one or more feature triggering indicia are associated with the cash ticket or an additional non-cash value or promotional ticket. The feature triggering indicia may comprise an award or promotion, such as for engaging in a transaction (such as a financial transaction at a kiosk). In one embodiment, the feature triggering indicia might be configured to associate one or more credits with a gaming machine for use in funding/triggering games.

In one embodiment of the invention, tickets comprise printed media, such as printed receipts. However, the tickets might comprise other media having data associated therewith (cards, etc.) and/or be virtual or electronic, such as where the ticket is represented by an image.

Further objects, features, and advantages of the present invention over the prior art will become apparent from the detailed description of the drawings which follows, when considered with the attached figures.

DETAILED DESCRIPTION OF THE INVENTION

Figure 1:
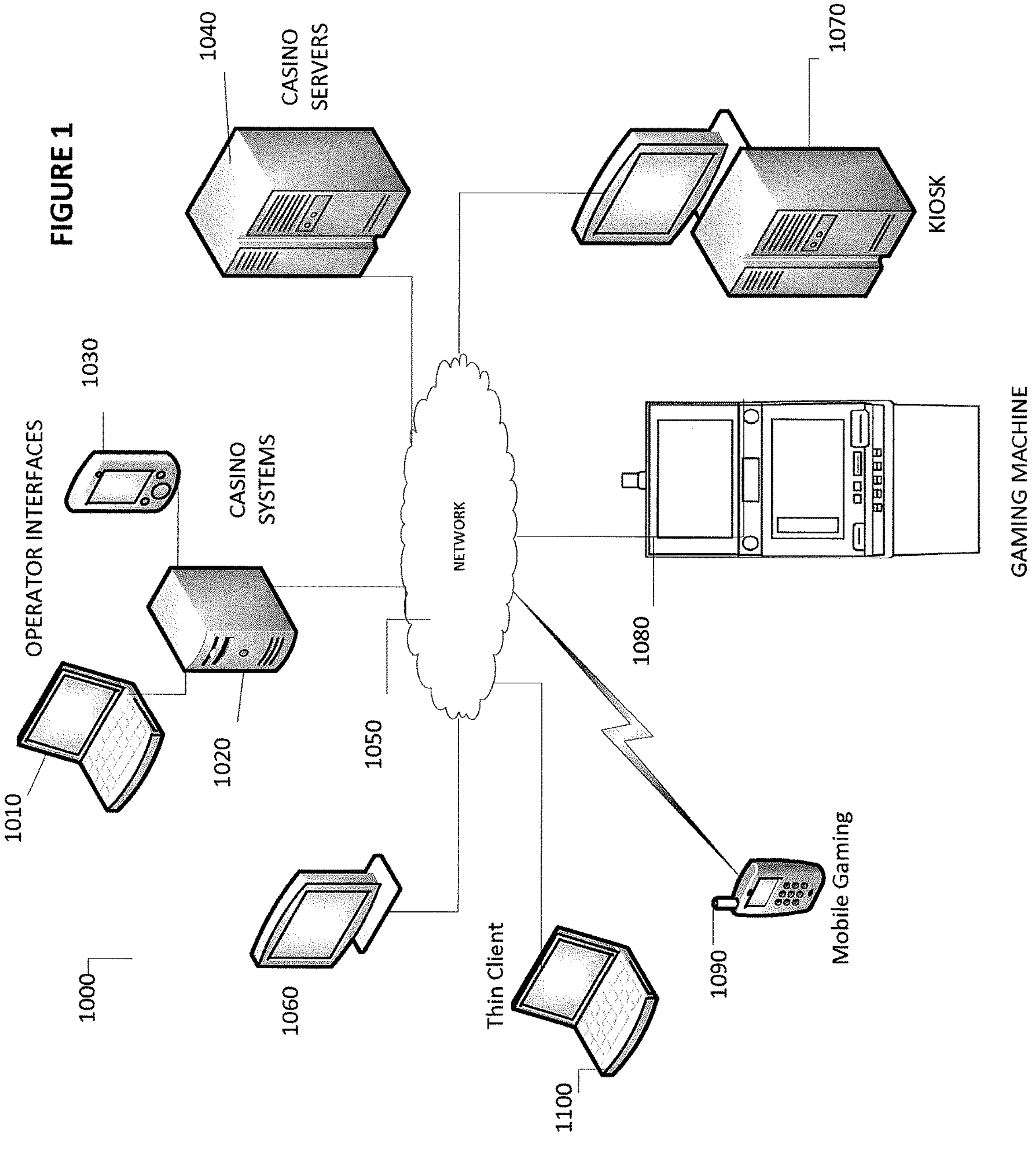
FIG. 1 is illustrates one embodiment of a system of the present invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a casino ticket system for providing game and credit related features to a gaming machine by using a ticket with special indicia printed on the ticket to trigger the special features when the ticket is read at the gaming machine, such as when inserted in a casino gaming machine's bill acceptor.

The disclosure, including the figures, describes the system, method and their components with reference to illustrative examples. For example, the disclosed system is shown as an addition to an existing casino system. However, it should be noted that the disclosed system may also be implemented as a standalone system completely separate from the existing casino systems. The present disclosure proceeds with respect to the system for illustrative purposes only. Other examples and embodiments are contemplated and are mentioned below or are otherwise imaginable to someone skilled in the art. The scope of the invention is not limited to the few examples and described embodiments of the invention. Rather, the scope of the invention is defined by reference to the appended claims. Changes can be made to the examples, including alternative designs not disclosed, and still be within the scope of the claims.

The present disclosure provides both a system and method for providing gaming machine functionality triggered by the insertion of a ticket along with the detection of one or more indicia printed thereon. Additionally, system kiosks are adapted to issue casino tickets with indicia on the tickets to patrons and gaming machines are configured to read the tickets, such as using gaming machine bill acceptors adapted to detect the indicia and send feature triggers to the gaming machine. The gaming machines are adapted to receive the feature triggers and use them to provide special features to patrons playing them.

One embodiment of a system of the invention will now be described with reference to FIG. 1. In one embodiment, the system 1000 is a casino system which is configured to present wager-based games to players, such as via one or more gaming machines. Preferably, those machines are configured to accept cash tickets or similar media and, at one or more times, implement various functionality or features in response thereto. As described below, however, the system may include various other devices and features, including related systems and devices.

As illustrated, in one embodiment a system 1000 includes one or more kiosks 1070 which are preferably capable of dispensing tickets, including cash and promotional tickets, one or more gaming machines 1080 which are configured to accept cash or other tickets, as well as other gaming system related features such as one or more casino servers 1040 (which servers may comprise game servers which are configured to present server based games via the gaming machines 1080 or other devices), a network 1050 which links various components of the system 1000, one or more operator interfaces 1010 for interacting with the system 1000 and/or the components thereof, 1030, casino systems 1020 such as casino accounting, casino player tracking or other features, and various other devices, such as for presenting mobile or remote gaming and the like, including computing devices 1100 such as desktop and laptop computers, tablets or the like (which may be configured as 1100, one or more mobile devices 1090 such as cell phones, PDA's or the like, and in-room gaming devices 1060, such as television set-top gaming devices.

In a preferred embodiment of the invention, the system is configured to operate within a physical casino. However, the system can assume a variety of forms including physical route locations similar to Nevada gaming routes, video lottery configurations operated by a governmental entity, or other physical locations where operation of a gaming machine 1080 is legal, and preferably where a system kiosk 1070, a network 1050, and one or more servers 1040 may be present or utilized.

Figure 2:
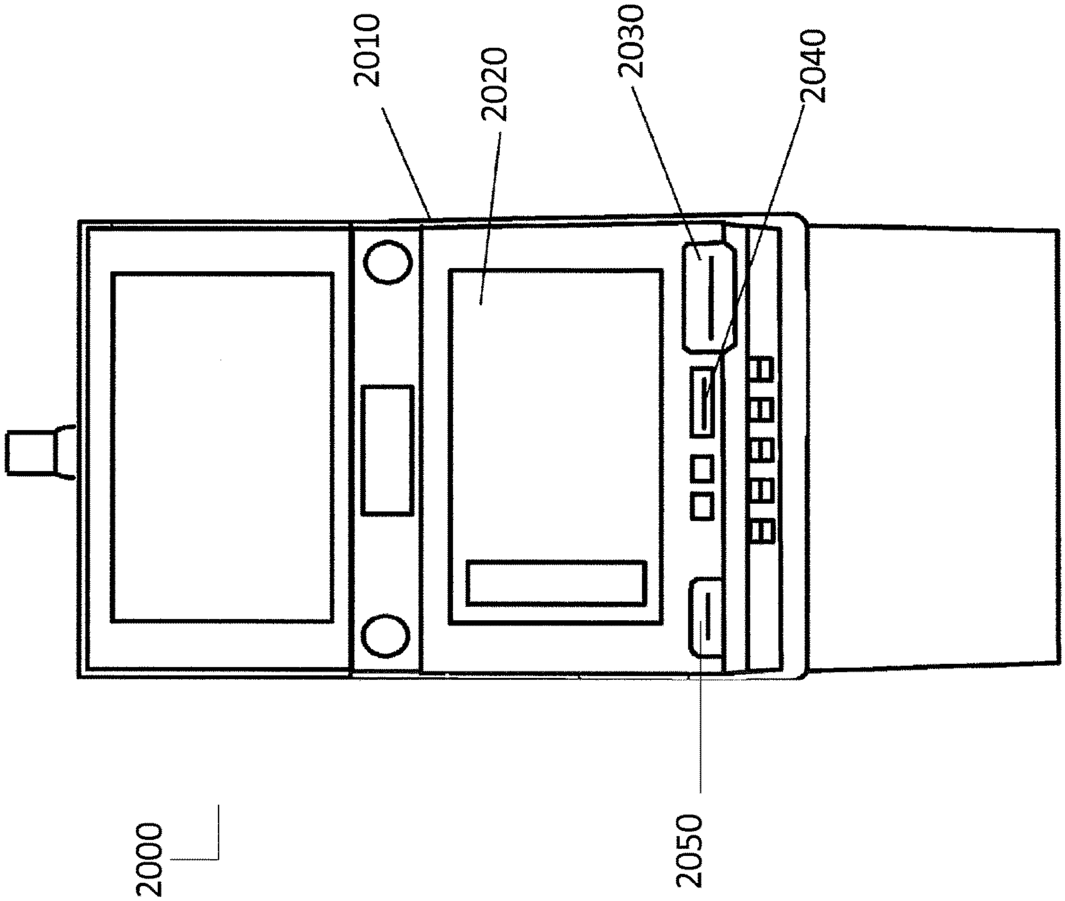
FIG. 2 illustrates a gaming machine of the system illustrated in FIG. 1.

FIG. 2 illustrates one embodiment of a gaming machine 2000 which is configured to present one or more wager-based games and which may be utilized in the system 1000 which is illustrated in FIG. 1. As illustrated, the gaming machine 2000 generally comprises a housing or cabinet 2010 for supporting and/or enclosing various components required for operation of the gaming machine. In the embodiment illustrated, the housing 2010 includes a door located at a front thereof, the door capable of being moved between an open position which allows access to the interior, and a closed position in which access to the interior is generally prevented. The configuration of the gaming machine 2000 may vary. In the embodiment illustrated, the gaming machine 2000 has an "upright" configuration. However, the gaming machine 2000 could have other configurations, shapes or dimensions (such as being of a "slant"-type or other configuration as is well known to those of skill in the art).

The gaming machine 2000 preferably includes at least one display device 2020 configured to display game information. The display device 2020 may be a mechanical, electro-mechanical or electronic display, such as one or more rotating reels, a video display or the like. When the display device 2020 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touch screen, a light emitting display (LED) or other suitable displays now known or later developed, in a variety of resolutions, sizes and formats (e.g. 4:3, widescreen or the like). The display 2020 may be capable of projecting or displaying a wide variety of information, including images, symbols and other indicia or information associated with game play, game promotion or other events.

In another embodiment, the gaming machine 2000 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference.

The gaming machine 2000 is preferably configured to present one or more games upon a player making a monetary payment or wager. In this regard, as described in more detail below, the gaming machine 2000 includes means for accepting monetary value.

In one embodiment, certain game outcomes may be designated as winning outcomes. Prizes or awards may be provided for winning outcomes, such as monetary payments (or representations thereof, such as prize of credits), or promotional awards as detailed herein. The gaming machine 2000 thus preferably includes means for returning unused monetary funds and/or dispensing winnings to a player.

The gaming machine 2000 preferably includes one or more player input devices (such as input buttons, plunger mechanisms, a touch-screen display, joystick, touch-pad or the like). These one or more devices may be utilized by the player to facilitate game play, such as by providing input or instruction to the gaming machine 2000. For example, such input devices may be utilized by a player to place a wager, cause the gaming machine 2000 to initiate a game (such as spin slot reels), to indicate cards to be held or discarded in a game of video draw poker, to "cash out" of the gaming machine, or to provide various other inputs.

In one preferred embodiment, the gaming machine 2000 includes at least one microprocessor or controller for controlling the gaming machine, including receiving player input and sending output signals for controlling the various components of the machine 2000 (such as generating game information for display by the display 2020). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 2020 (such as information representing images of displayed cards, slot symbols or the like), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. This software may be configured to implement the game described below, such as in the form of one or more steps. The memory may also store other information, such as pay table information, slot reel symbol images or the like. The gaming machine 2000 may also include one or more random number generators for generating random numbers, such as for use in selecting slot reel symbols or reel stopping positions or the like for presenting the game in a random fashion.

As indicated above, the gaming machine 2000 may be configured to generate and present games in a stand-alone manner or it may be in communication with one or more external devices at one or more times. For example, the gaming machine 2000 may be configured as a server based device and obtain game code or game outcome information from a remote game server (in which event the gaming machine controller may receive game information from the server, such as game outcome information, and use that server-generated information to present the game at the gaming machine). In one embodiment, the gaming machines 2000 may be game kiosks or interfaces.

As indicated, the gaming machine 2000 is configured to present one or more wagering game. Thus, the gaming machines 2000 are preferably configured to accept value. In a preferred embodiment, the gaming machine 2000 includes a media acceptor 2030. Preferably, the media acceptor 2030 is configured to accept and read/verify paper currency and/or other media such as a cash ticket. For example, such an acceptor 2030 may be configured to feed currency or cash which is presented to the gaming machine 2000 into an optical reader. That reader may read various information on the currency or ticket, such as special feature-triggering indicia as described below. Of course, in such event the gaming machine 2000 may further be configured with one or more paper currency or ticket storage devices, such as cash boxes, and other paper currency or media handling devices (including transport devices).

The gaming machine 2000 might also be configured to read FOBs, magnetic stripe cards or other media having data associated therewith and via which value or funds may be associated with the gaming machine 2000. The gaming machine 2000 might also include other readers, such as RFID or image readers, such as for reading electronic tickets represented by images, RFID tags or other data.

In one embodiment, the gaming machine 2000 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 2000, such as by issuing a printed ticket from a ticket printer 2040, which ticket represents the value which was paid or cashed out of the machine.

It will be appreciated that the gaming machine illustrated is only exemplary of one embodiment of a gaming machine. For example, it is possible to for the gaming machine to have various other configurations, including different shapes and styles and having different components than as just described. For example, while the gaming machine or device may be standalone, it may be server-based, server-assisted, linked to other gaming devices, connected to a server, progressive controller (wide-area or local-area), or be hand-held and/or wireless. In particular in the case of online wagering, the gaming device may be a computer, mobile phone, or microprocessor-driven device which is programmed to accept wagers, e.g. via downloadable software. The gaming machine or device 2000 may include other features. For example, the gaming machine 2000 may include other displays, light, speakers for generating sounds. The gaming machine 2000 may also include a player tracking card reader 2050 or other devices and interfaces to various systems.

Figure 3:
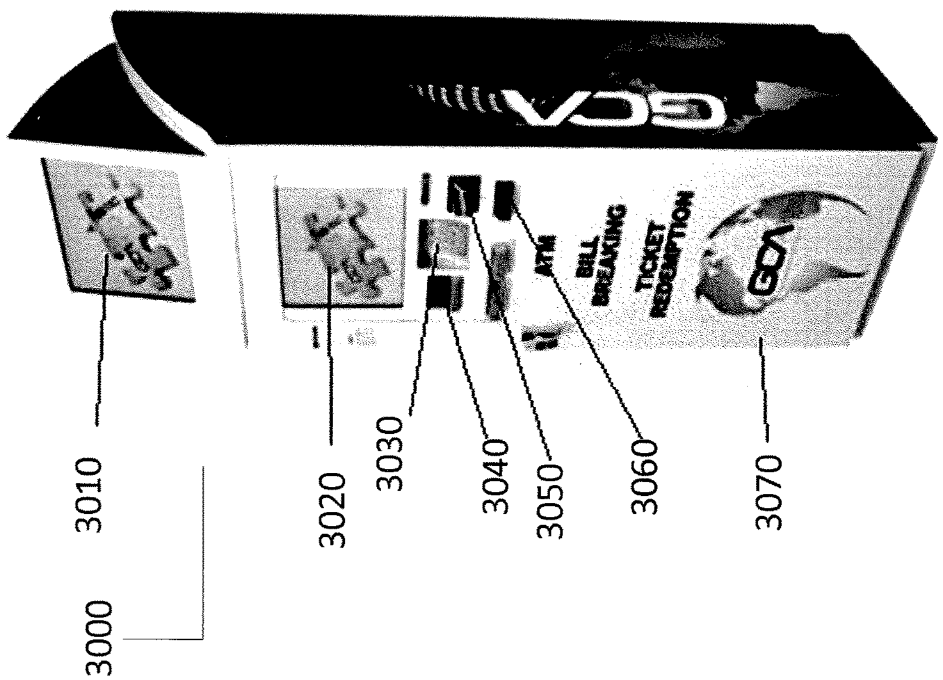
FIG. 3 illustrates a cash and ticket kiosk of the system illustrated in FIG. 1.

As indicated, the system 1000 preferably also includes at least one kiosk. One embodiment of such a kiosk 3000 is illustrated in FIG. 3. Preferably, the kiosk 3000 is configured to generate cash tickets or, as described below, promotional or non-cash tickets, such as virtual credit tickets, which tickets can be presented to a gaming machine of the system. In a most preferred embodiment, at one or more times those tickets have associated indicia which may be read and utilized by one of the gaming machines 2000 to trigger game features (such as when such a ticket bearing indicia is inserted in a gaming machine media reader 2030 and one or more the indicia are detected).

The kiosk 3000 may comprise an ATM type device or other devices. For example, in one embodiment, the kiosk 3000 is configured to associate a player's funds with a cash ticket, which cash ticket can be utilized by the player at one or more gaming machines to fund wagering activity. For example, the kiosk 3000 might include a bill validator and/or coin acceptor for accepting bills and/or coins from a player. The kiosk 3000 may associate those funds with a cash ticket which is dispensed to the player, which cash ticket may be presented by the player to a gaming machine as described below.

In other embodiments, the kiosk 3000 may be configured to read credit cards, ATM cards or other cards or otherwise facilitate various types of monetary transactions (whether cash, credit, via a player's existing bank account, a new credit line, etc.) and associate funds with a cash ticket. For example, a player might present a bank card at the kiosk 3000. The kiosk 3000 may communicate with an ATM network for processing a credit or debit transaction. Funds accessed by the player may be associated with one or more cash tickets which are dispensed to the player.

The kiosk 3000 of the preferred embodiment may include a cabinet 3070 which houses or support a ticket printer 3060, a bill acceptor 3050, a card reader 3040, and a display 3020 with optional display 3010. Of course, the kiosk 3000 may have various configurations, including various shapes and sizes and features. The kiosk 3000 preferably includes at least one controller, such as for controlling the various peripherals devices thereof (which controller may comprise, for example, a processor which is configured to execute machine readable code, such as game code which is stored in an associated memory or other medium). The kiosk 3000 may be in communication with one or more external devices or systems, such a casino server 1040, such as via a communication interface.

Figure 5:
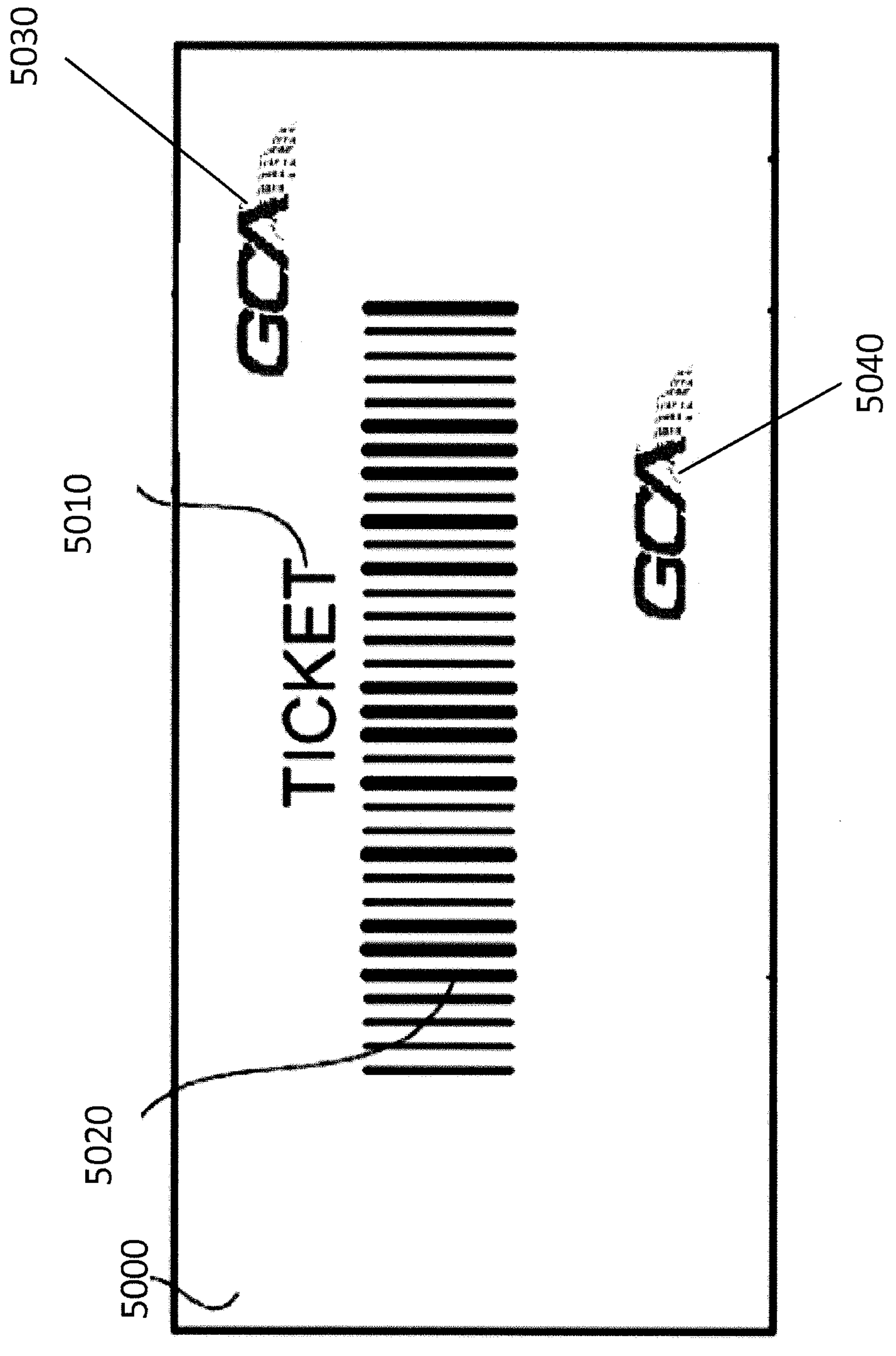
FIG. 5 illustrates one example of a ticket having a feature triggering indicia in accordance with the present invention.

FIG. 5 illustrates one embodiment of a casino cash ticket 5000 in accordance with the invention. In one embodiment, the casino cash ticket 5000 includes bar code 5020 or similar information which may be used to identify the ticket and/or its associated value. Such information may comprise a two or three-dimensional code or other printed or displayed information. In addition, the cash ticket 5000 may include information which represents the ticket type 5010.

In a preferred embodiment, the cash ticket 5000 may also include one or more feature trigger indicia 5030. The feature triggering indicia 5030 may have various forms and comprise various elements. For example, the feature triggering indicia 5030 may comprise: company logos, promotion information, player information, casino information, casino logos, game logos, game types, game manufacturer logo, or any information that may take the form of indicia printed on ticket 5000 such as numbers, letters, symbols, images, icons, logos, codes or combinations and variations thereof.

In one embodiment, a cash ticket 5000 may include more than one feature triggering indicia. Thus, the cash ticket 5000 may include a second feature triggering indicia 5040. The second or other feature triggering indicia may be of the same type or a different type as the first one. Further any number of indicia in any type may be present on a single cash ticket 5000 and may be strategically located where they can be scanned/read or detected. The feature triggering indicia may be pre-printed on cash tickets issued by system kiosk 3000 or system kiosk 3000 may print the indicia in real-time as the ticket is issued.

Figure 4:
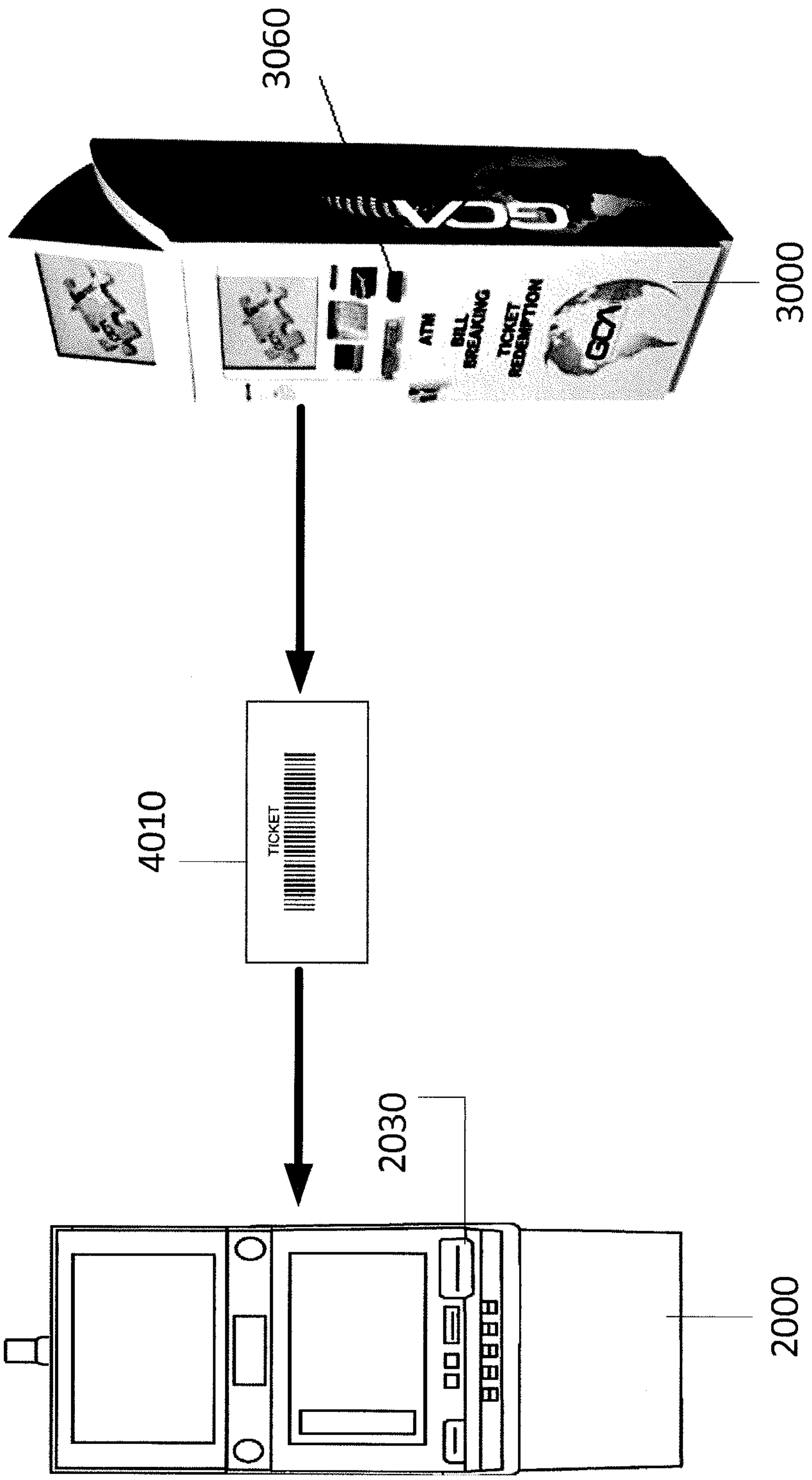
FIG. 4 illustrates the dispensing of a ticket from a kiosk and then the presentation of that cash ticket at a gaming machine.

In one embodiment of the invention, the disclosed system 1000 uses cash tickets to trigger features, such as game features, at a gaming machine 2000. In particular, as illustrated in FIG. 4, a cash ticket 4010 may be issued from a system kiosk 4000 (though the cash ticket 4010 could be issued in other manners, such as from a gaming machine 2000 at cash-out or for other reasons). As indicated above, the cash ticket 4010 may include one or more feature triggering indicia.

As illustrated, a player may present the cash ticket 5000 to a gaming machine 2000, such as by inserting it into the media reader 2030. When the reader detects the presence of a feature triggering indicia, that information is preferably utilized to initiate a feature. In one embodiment, information regarding the feature triggering indicia may be transmitted to the gaming machine's processor or controller which utilizes that information to trigger a feature (for example, gaming machine may store a look-up table of features which correspond to particular feature triggering indicia). In other embodiments, it is possible for information regarding the feature triggering indicia to be forward to a remote game server which, in turn, causes the gaming machine to initiate the feature.

In a preferred embodiment, the cash ticket 4010 is issued with the cash amount printed or encoded thereon (or with information which can be used to verify or determine the value of the ticket printed thereon). As indicated herein, the cash ticket 4010 might be issued from a kiosk 4000 (such as a result of a monetary transaction processed at the kiosk, such as the input or transfer of funds to the kiosk), from a gaming machine 2000 (such as in response to a request from a player to cash out funds associated with the machine or for other reasons), or from other devices. In addition, the cash ticket 4010 may include one or more feature triggering indicia, such as printed on the ticket in predefined regions thereof. The cash ticket 4010 is first issued to the patron and then the patron takes the cash ticket 4010 to a gaming machine 2000 or any other device that accepts cash tickets and inserts the cash ticket 4010 into the media reader 2030, such as the bill acceptor/ticket reading device. When the cash ticket 4010 is inserted into gaming machine 2000, the media reader 2030 reads the cash ticket 4010, scans the cash ticket 4010 for one or more feature trigger indicia (such as located in strategically positioned locations on the cash ticket 4010), and then validates the cash ticket 4010. Upon successful validation of cash ticket 4010 by gaming machine 2000, the feature trigger information is communicated from the media reader 2030, causing the feature to be initiated at the gaming machine.

Feature trigger functionality which is initiated at the gaming machine 2000 in response to the presence of a feature triggering indicia on a presented cash ticket may include (but is not limited to) one or more of: adding monetary credits or increasing a monetary credit balance, adding non-monetary credits or increasing a non-monetary credit balance, one or more bonus features, special pay tables (such as having one or more different payouts or different winning and/or losing outcomes), special game screens, special information to be presented to the player on the game display, special games or other opportunities to wager and win additional credits, or any similar functionality where new features are enabled by the detection of the indicia.

Feature trigger functionality may only be enabled or triggered based upon secondary criteria, such as a particular time of day, a predetermined amount of time after the ticket is issued, time of month, holiday, sequence of days (such as weekend or promotional dates), or the feature might be enabled randomly. For example there may be 3 features provided by a specific wagering game when a feature trigger indicia is detected. One of the three features may be selected randomly by the gaming machine's software or the three features may be presented as options to the player wherein the player is asked to choose which one of the three features. The presentation of feature options to the player may be on any of the displays available on the gaming machine. (i.e. secondary, tertiary, or other game display) or may be provided in a pop-up window on the main gaming machine display. As described herein, in one embodiment the feature trigger might provide for additional or promotional credits which can be used at a gaming machine. These credits might be useable just like normal monetary value credits, or might only be usable for certain games (including versions of monetary wagering games having different pay tables or features), or only be usable at certain times. For example, in one embodiment promotional credits might only be used at the gaming machine where the feature is triggered and might not be capable of being "cashed-out" from the machine or moved or played at other machines.

In other embodiments, triggered features may be combined. For example, special features may be triggered if a cash ticket was printed from a specific manufacturer's kiosk or if a game manufacturer logo or game brand logo was also printed on the ticket. When that particular manufacturer's gaming machine accepts the ticket, the gaming machine provides the trigger feature information to the gaming machine's game processor or controller.

Figure 6:
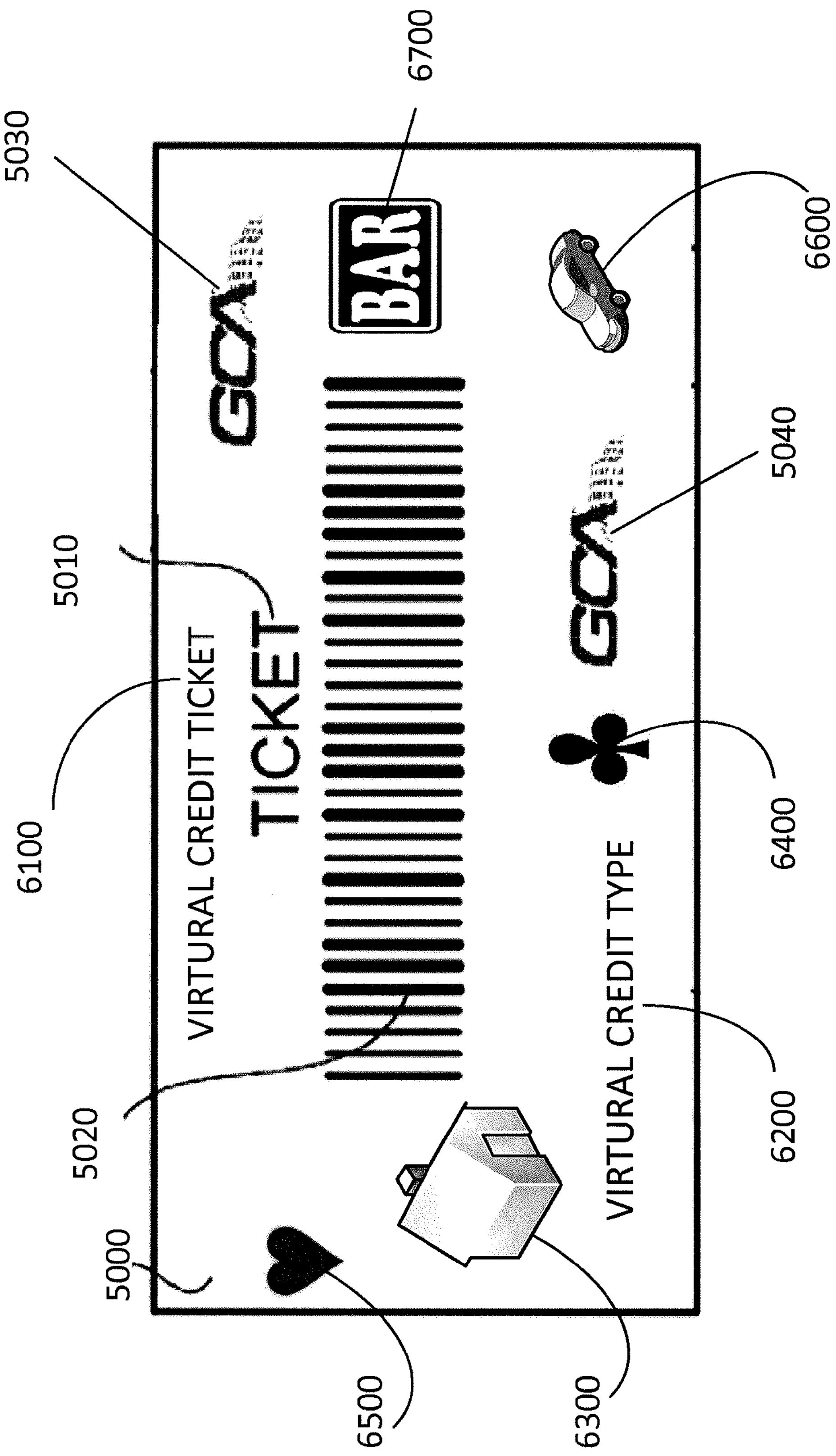
FIG. 6 illustrates an example of a virtual credit ticket having a feature triggering symbol in accordance with the present invention.

In another embodiment of the invention, features of the invention may be applied to tickets other than cash tickets. For example, aspects of the invention include promotional tickets and tickets representing non-cash values, bonuses and promotions. One embodiment of a non-cash ticket 5000 is illustrated in FIG. 6. As illustrated, the ticket 5000 may again include information regarding the ticket type 6100, which information may indicate that the ticket is not a cash ticket but is instead a type which provides other than cash credits or game play credits. As one example, ticket type 6100 may provide virtual credits. Virtual credits preferably have no monetary value, but instead may comprise credits for virtual objects used by a particular game type or group of games played on gaming machines by patrons. Virtual game credits may include credits or points needed to achieve a specific game level, needed to obtain a specific game component, or may include credits or virtual objects that can be used within gaming machine virtual environments defined by a game.

Such a promotional or non-cash ticket 6000 may also include one or more feature triggering indicia. FIG. 6 illustrates some examples of additional feature triggering indicia. Such feature triggering indicia might, of course, be used with a cash ticket such as that described above. For example, in one embodiment, indicia may be printed on a ticket 5000 which triggers special bonuses. For example FIG. 6 illustrates a ticket 6000 having a first feature triggering indicia 6500 and a second feature triggering indicia 6400. When either of these indicia is detected on a presented ticket, the patron may receive a special bonus for the day such as double credits, extra credits or promotional credits. Other indicia such as indicia 6300, indicia 6400, indicia 6500, indicia 6600, and indicia 6700 may trigger other features within the game when they are detected by the bill acceptor and communicated to the gaming machine processor.

As described herein, in one embodiment a cash ticket may be generated, such as in response to a player providing funds to a kiosk. As indicated, such a cash ticket may include one or more feature triggering indicia. As also described, however, one or more non-cash tickets may be generated and issued to the player. As one example, a player might associate funds with a kiosk (by providing cash or coins or engaging in a financial transaction at the kiosk). In response, the kiosk might issue a first cash ticket and a second promotional ticket. The promotional ticket might comprise, for example, a ticket with only one or more feature initiating indicia associated therewith.

As indicated below, various criteria may be used in determining whether to issue feature triggering indicia (associated with a cash ticket or as part of a secondary ticket). For example, a kiosk of the invention might be operated by a financial transaction processor. In order to entice a player to use the kiosk to process a financial transaction (such as by using their credit or debit card at the kiosk or opening a new line of credit or the like, which transactions may involve a fee), the processor might issue one or more promotional tickets to the player, which promotional tickets have associated feature triggering indicia, such as indicia which includes one or more promotional credits which may be used at one or more gaming machines for play of games, such as free play of one or more games.

As one example, a player might use a debit card at a kiosk in order to access funds. The accessed funds may be associated with a cash ticket which is dispensed to the player and which can be presented by the player at a gaming machine in order to fund game play at the machine. In addition, the player may be issued a separate ticket, such as a non-cash feature ticket. This promotional type of ticket may have one or more feature triggering indicia associated therewith, such as a feature trigger which provides additional credits for play at a gaming machine. In one embodiment, various criteria may be applied in determining whether to issue the secondary ticket and/or the awards associated with the ticket. As one example, different numbers of promotional credits might be awarded depending upon the size of the financial transaction requested by the player (e.g. 5 free credits for a requested financial transaction between $20-100, 15 for a transaction between $101 and $250, etc.).

As another example, a player might have funds associated with a gaming machine (such funds might have been provided to the gaming machine by the player and/or awarded as winnings). The player might desire to cash out those funds from the machine. As indicated above, in response, the gaming machine might be configured to generate a cash-out ticket having associated monetary value (e.g. representing the balance of the funds that were associated with the gaming machine). The cash-out ticket might have one or more feature triggering indicia associated therewith as indicated herein or a separate promotional ticket having one or more feature triggering indicia might be issued with or generally proximate in time (before or after) the cash-out ticket. Once again, the feature triggering indicia might comprise one or more free credits/games or the like. For example, in the situation where the player is issued a cash-out ticket and a separate promotional ticket, the player might redeem the cash-out ticket at a kiosk or cashier's station. The player might take the promotional ticket to another (or the same) gaming machine so trigger the feature, such as to be credited the game credits/free game(s) or the like. Once again, the value of the feature trigger might vary. As one example, the number of free games or free credits might depend upon the value of the funds the player is cashing out or has wagered or lost. For example, a player might provide $X to the gaming machine for play. If the player cashes out more than 75% of those funds, then the player might receive a first number of credits or free games, if the player cashes out between 50-75% of those funds the player might receive a second, higher number of credits or free games, and if the player cashes out less than 50% of those funds the player might receive an even higher third number of credits or free games via the one or more feature trigging indicia. As indicated herein, other criteria might be used to determine when to issue one or more feature triggering indicia or the value of the feature.

In other embodiments of the invention, combinations of two or more feature triggering indicia may result in one or more special game features such as game play, game pay table, game bonuses, extra credit, promotional credits, virtual game pieces, virtual game objects that can be used to enhance a game, anything of value that can be used by the game, anything of use for within a game, and any unique promotion or award. For example, in one embodiment when the player plays a game where virtual game pieces are part of the game and a player presents a ticket in accordance with the invention which includes a feature triggering indicia 6400, the player would receive a car object for use in the game. In another example, the player could receive a special feature such as a special bonus, additional credits, free play and/or a special bonus game.

Figure 7:
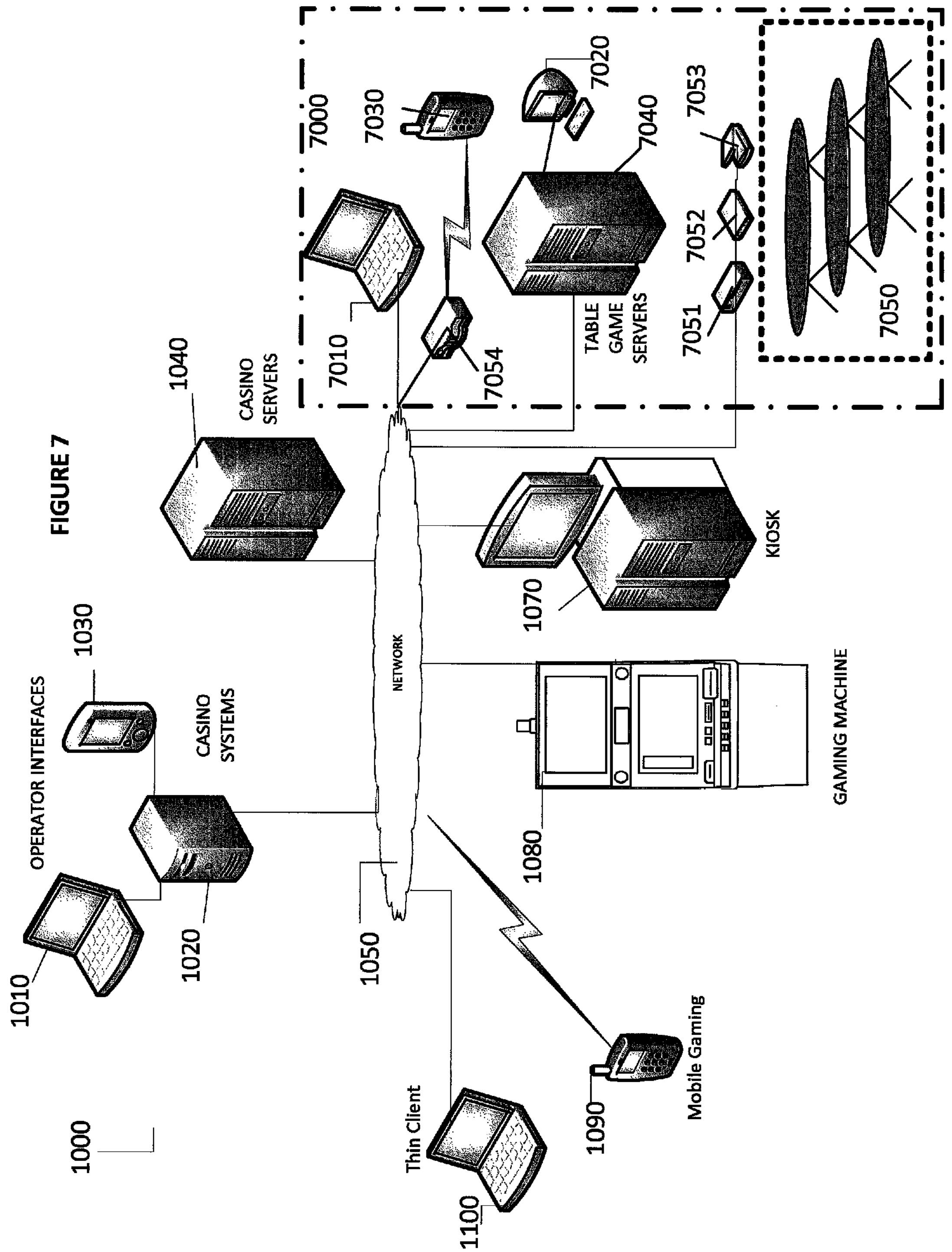
FIG. 7 illustrates another embodiment of a system of the present invention.

In one embodiment of the invention, a ticket having a feature triggering indicia may be used or presented at other than a gaming machine. For example, as illustrated in FIG. 7, such a ticket may be used in conjunction with the play of one or more table games 7050, such as games of blackjack, roulette, craps, war, poker, etc. For example, a patron may hands their ticket to a dealer or attendant who validates the ticket and determines if there are any feature trigger indicia present on the ticket. Alternatively, the dealer or attendant might insert the ticket into a ticket acceptor 7051, scanner 7053 or other reader 7052 that can read the ticket.

In other embodiments the patron might directly insert or present the ticket to the bill acceptor 7051, reader 7052, scanner 7053 or similar device. In such a configuration, one or more game tables may be associated with table game servers 7040 and, optionally, workstations 7020 or 7010, to determine the features of scanned tickets and to provide triggering functionality to the patron based upon the ticket.

When a ticket is processed as described above, it is may be scanned using technology such as optical character recognition (OCR) to determine if there are any ticket feature trigger indicia present on the ticket. If one or more feature triggering indicia are determined to be present on the ticket, the patron is provided with one or more special features for the table game. For example, the special feature may be a matching bet feature where the dealer provides the patron with an amount equal to their current bet which can be played. Or the special feature may be a game bonus providing the table game player with increased payouts, better odds or other similar enhancements to the game specifically for the patron whose ticket has been determined to contain one or more indicia.

The disclosed system may be adapted to any variety of games now known or later developed. Such games include, but are not limited to, poker games, slot games, keno games, bingo games, or even non-gaming machine game formats In other embodiments, a ticket may have a plurality of bar codes wherein a first bar code is used to validate a cash amount and a second, third, fourth, and so on, bar code may be validated for one or more game feature trigger functionality described herein.

While the tickets described herein may be printed tickets, e.g. tickets comprising information associated with a physical media, the tickets might comprise "e"-tickets, such as electronic data. For example, such tickets might be represented by an image or the like.

As one example, images of tickets may be used on networked devices such as a smart phone 7030 or touch pad device (e.g. iPAD, iPOD or similar device) 1090 and may connect to the disclosed system over wireless communication device 7054 such as a wireless router to communicate feature tickets electronically.

In other embodiments, an image of the ticket is displayed on the smart phone and scanned using optical image capture technology by the gaming machine, gaming location, and table game. The ticket image may also be detected by the gaming machine, gaming location and table game using other forms of communication such as blue tooth or NFC or RFID wherein the smart phone communicates with the gaming device and communicates trigger feature information.

In yet other embodiments, the ticket may physically include technology associated with Near field Communication (NFC) and Radio Frequency Identification (RFID) or other similar technologies wherein the ticket contains indicia as well as the appropriate physical technology and is then held physically close to a gaming device such as a gaming machine, gaming table or other gaming location within the casino. For example in a table game location with the casino, a reader 7052 detects the ticket when it comes into range at a table game. Using NFC or RFID technology, the ticket is read and it is determined whether the ticket has trigger features associated with it. If it is determined that it does, the features are provided to the patron as described above by either a dealer or attended or automated and awarded to the patron at a table game player station on table 7050.

In other aspects of the disclosure, regulatory indicia or responsible gaming indicia may also be printed on the ticket and may be combined with GCA indicia and/or game manufacturer/brand indicia. For example, if the regulatory agency had special requirements associated with dynamic features present within the gaming machine, the regulatory logo indicia may be used as a feature trigger that confirms regulatory approval or which specific features may be triggered within that gaming jurisdiction. When responsible gaming indicia is printed on a particular cash ticket, the feature trigger information may limit forms of game play, rate of game play or other responsible gaming related features affecting game play. For example, such responsible gaming indicia may be printed on tickets over a certain cash value or for patrons who have used the system kiosk more than one time within a predefined time interval.

As indicated above, a ticket may include or may not include one or more feature triggering indicia. In this regard, feature triggering indicia may be included on tickets based upon various criteria. For example, feature triggering indicia could be included on tickets randomly. In other embodiments, every ticket could include at least one feature triggering indicia. In yet other embodiments, feature triggering indicia might be included on tickets at certain times (such as on certain days or during slow periods). For example, the feature triggering indicia may be used as a promotional feature to entice game play. Featuring triggering indicia might be included or might vary based upon the value of the ticket. For example, a first player who obtains a ticket having an associated monetary value of $100 may receive a lower value feature triggering indicia than a second player who obtains a ticket having an associated value of $1000.

In a preferred embodiment of the invention, the feature which is triggered at a gaming machine by presentation of a ticket having a feature triggering indicia is a feature which would not otherwise have been triggered at the gaming machine as a result of the player's presentation of a ticket which did not include the feature triggering indicia. In other embodiments, the feature might be one that is entirely unique and would not be presented at the gaming machine at any time except in the event that a ticket bearing the feature triggering indicia is presented.

Figure 8:
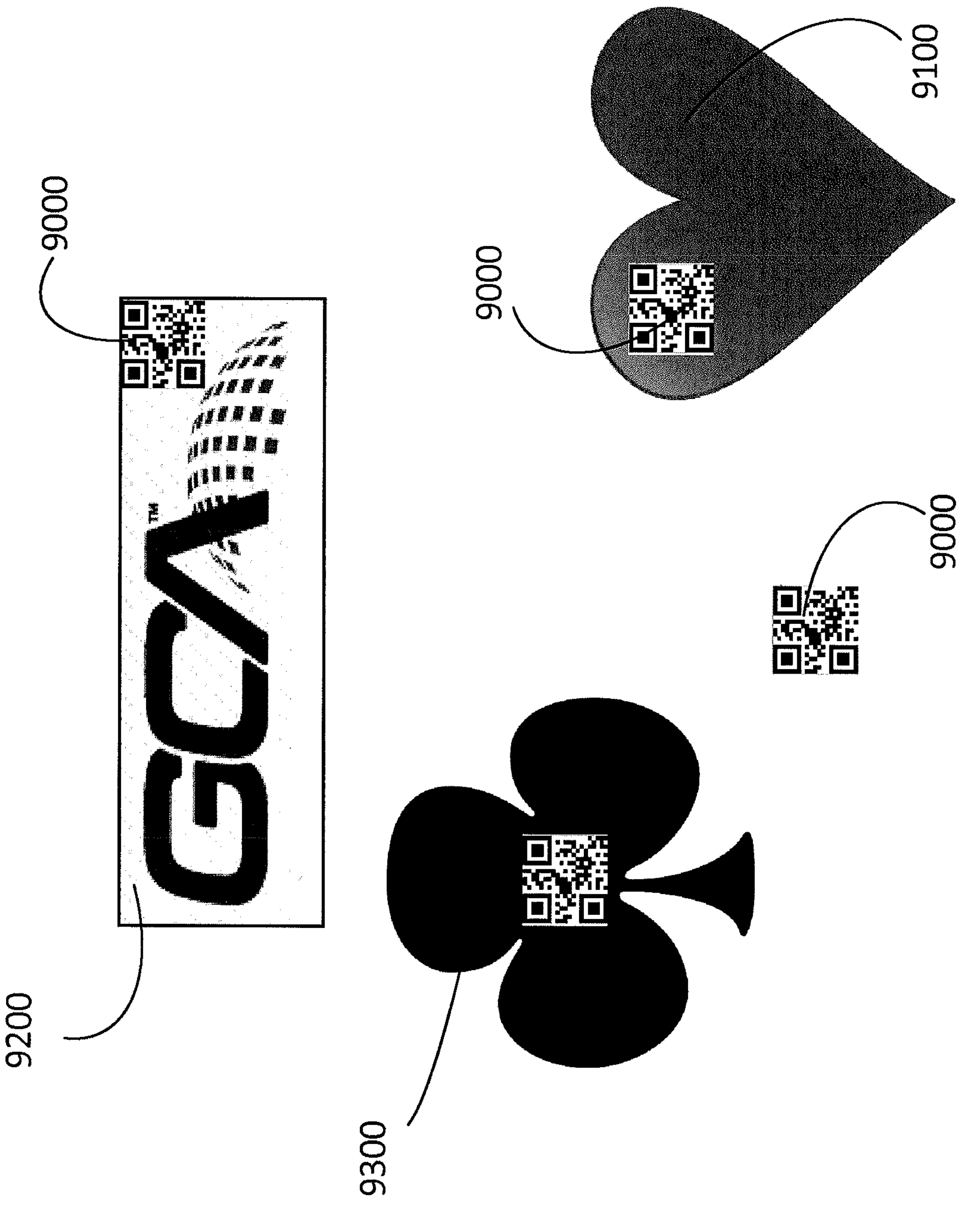
FIGS. 8 and 9 illustrate other embodiments of tickets bearing feature triggering indicia in accordance with the invention.
Figure 9:
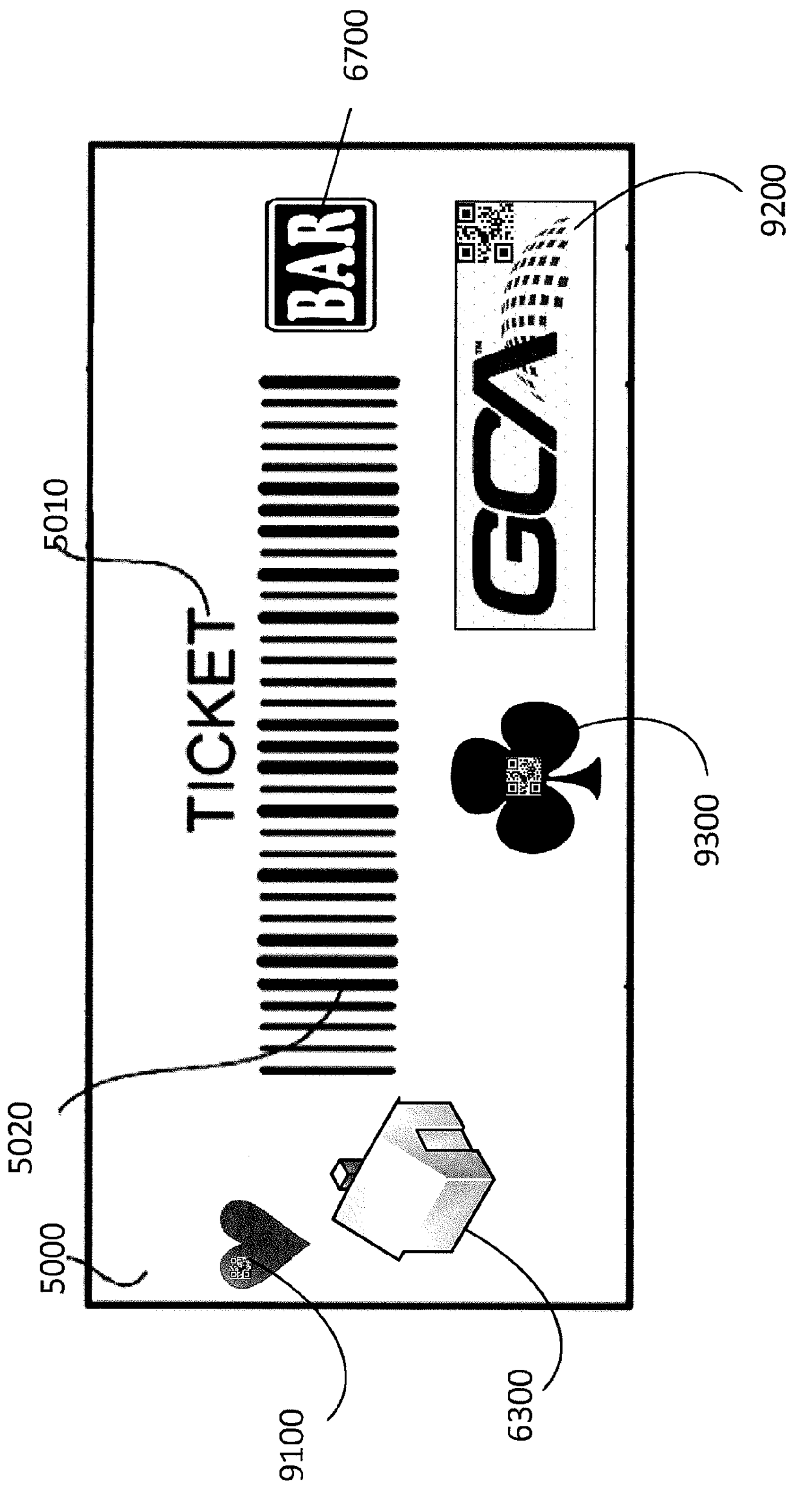

In another embodiment of the invention, particularly illustrated in FIG. 8, feature triggering indicia may include or be associated with a code such as a barcode. In such a configuration, the feature triggering indicia may provide a visual notification to a player that the ticket includes a feature trigger. In addition, however, the code may be used to validate the feature trigging indicia (and thus prevent, for example, a player from stamping a ticket with a feature triggering indicia and causing a gaming machine to them initiate the feature). For example, the barcode may be printed as part of the feature triggering indicia. In the example illustrated in FIG. 9, a QR code 9000 (developed by Toyota) may be used within the feature triggering indicia to validate the feature triggering indicia prior to enabling of the feature. For example, feature triggering indicia 9100, 9200, and 9300 may further include a QR code 9000 within the indicia. As further illustrated in FIG. 9, casino cash ticket 5000 may include a plurality of feature triggering indicia 9100, 6300, 9300, 9200, and 6700 some of which require validation as described above and others of which do not.

The QR or other code may be read by the media reader of the gaming machine. The gaming machine may use the code to verify the feature triggering indicia. For example, in one embodiment, a server may be configured to generate feature triggering indicia codes and then transmit them to kiosks for use. The kiosk may print a feature triggering indicia having an assigned code onto a ticket. The player may then present the ticket to the gaming machine which reads the code. The gaming machine may forward the code to the server to validate it, such as to ensure that it is a validate code and that the code has not already been redeemed. Once the code has been used or redeemed, the server may close or flag the code from further use. Upon validation, the server may send instructions to the gaming machine to implement the feature.

In one embodiment, the feature triggering indicia code may actually define the feature to be triggered and/or any associated criteria. In this arrangement, the while the feature triggering indicia may include an icon or symbol which is useful in identifying the existence of such a feature to the player, the associated code may be what is read by the gaming machine and then used to trigger the feature. For example, a particular code may identify that the feature to be triggered is "10 bonus credits" and that associated criteria, such as "only award credits if the ticket is present on a weekday."

One advantage of the invention is that feature triggering indicia may be utilized to implement various game features without gaming system changes which may require regulatory approval (and thus would slow down implementation of the feature). First, some feature may be implemented without even changing the main configuration of a gaming machine. For example, a gaming machine may already be programmed to indicate credits. A feature such as increasing the number of credits could easily be implemented by causing the bill validator to send a signal to the gaming machine controller in response to the detection of a particular feature triggering indicia, which signal causes the gaming machine to increase the number of credits just as if paper currency were provided to the bill acceptor. In other instances, features may easily be implemented by only changing the gaming machine code and not the system code. For example, as indicated above, game software at a gaming machine could be configured to cause a certain bonus game to be presented in the event the gaming machine detects a particular feature triggering indicia.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a feature at a wagering game based upon a feature triggering indicia associated with a ticket, said method comprising:
- receiving input from a player to a kiosk of a desired financial transaction;
- processing said financial transaction;
- generating at least one ticket at said kiosk, said ticket having at least one feature triggering indicia;
- issuing said at least one ticket from said kiosk;
- reading said at least one ticket at a reader associated with a gaming device at which one or more wagering games are presented; and
- implementing at least one game feature at said wagering game presented at said gaming device in response to the presence of said at least one feature triggering indicia.

2. The method in accordance with claim 1 wherein said at least one ticket has associated monetary value and further comprising the step of crediting the monetary value of said at least one ticket.

3. The method in accordance with claim 2 wherein said step of crediting comprises issuing monetary value chips.

4. The method in accordance with claim 1 wherein said step of issuing comprises dispensing printed media comprising said one or more tickets.

5. The method in accordance with claim 1 wherein said step of issuing comprises transmitting electronic data representing said at least one ticket.

6. The method in accordance with claim 1 wherein said gaming device comprises a gaming table.

7. The method in accordance with claim 6 wherein said at least one game feature is implemented by a dealer.

8. The method in accordance with claim 6 wherein said media reader is located at said gaming table.

9. The method in accordance with claim 1 wherein said financial transaction comprises a debit or credit transaction associated with a financial account of the player.

10. The method in accordance with claim 1 wherein said input comprises input of currency and/or coins to said kiosk and said processing comprises the step of crediting said currency and/or coins at said kiosk.

11. The method in accordance with claim 1 further comprising generating a first ticket having an associated monetary value and generating a second ticket having said at least one feature triggering indicia.

12. The method in accordance with claim 11 wherein said monetary value is derived from said financial transaction.

13. The method in accordance with claim 1 wherein said step of implementing at least one game feature comprises one or more of awarding monetary value credits or chips, enabling a bonus game, changing a pay table, providing free play and awarding one or more playing cards.

14. A gaming system comprising:

a server configured to generate at least one feature triggering indicia;

a kiosk communicatively coupled with said server, said kiosk configured to:

accept input of a desired financial transaction;

generate at least one ticket having said at least one feature triggering indicia; and issuing said at least one ticket from said kiosk;

and a ticket reader communicatively coupled with said server and said kiosk and associated with a gaming device at which a wagering game is presented, said ticket reader configured to:

read said at least one ticket;

detect if the generated at least one feature triggering indicia is present on the at least one ticket;

validate any detected feature triggering indicia with said server; and output an indication of a game feature to be implemented at said wagering game.

15. The gaming system in accordance with claim 14, wherein said gaming device comprises a gaming table.

16. The gaming system in accordance with claim 14 wherein said financial transaction comprises a debit or credit transaction associated with a player's financial account.

17. The gaming system in accordance with claim 16 wherein said financial transaction comprises processing of currency and/or coins.

18. The gaming system in accordance with claim 14 wherein said at least one ticket has associated monetary value.

19. The gaming system in accordance with claim 14 comprising generating a first ticket having associated monetary value and a second ticket having said at least one feature triggering indicia.

20. The gaming system in accordance with claim 14 wherein said step of validating comprises:

transmitting information regarding the detected feature triggering indicia to said server; and determining at said server if the generated feature triggering indicia is valid.

21. The gaming system in accordance with claim 20 wherein said server is further configured to close the generated feature triggering indicia from further use if the generated feature triggering indicia is valid.

22. The gaming system in accordance with claim 14 wherein said game feature comprises at least one of issuing monetary value credits or chips, enabling a bonus game, changing a pay table, providing free play, and awarding one or more playing cards.

23. The gaming system in accordance with claim 14 wherein said step of issuing comprises dispensing printed media comprising said one or more tickets.

24. The gaming system in accordance with claim 14 wherein said step of issuing comprises transmitting electronic data representing said at least one ticket.

* * * * *